United States Patent Office 3,178,597
Patented Apr. 13, 1965

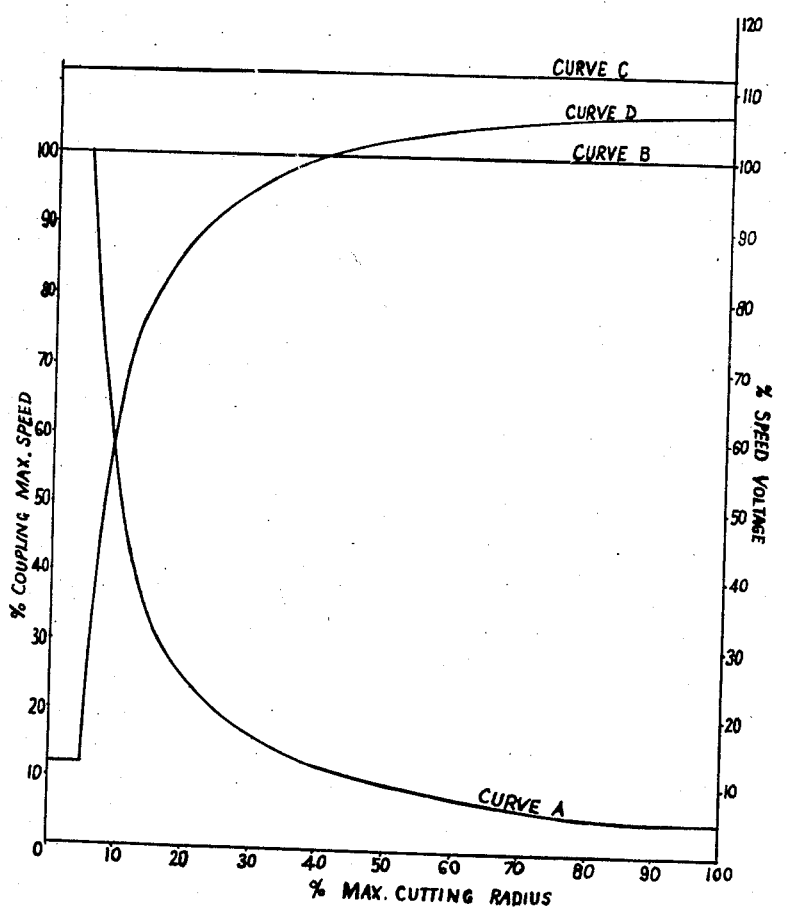

3,178,597
ELECTRICAL SYSTEMS FOR AUTOMATICALLY CONTROLLING THE SPEED OF A BODY
Norman Roy Bancroft, Cambridge, England, assignor to Pye Limited, Cambridge, England, a British company
Filed Oct. 17, 1960, Ser. No. 63,194
Claims priority, application Great Britain, Oct. 21, 1959, 35,685/59
8 Claims. (Cl. 310—95)

The present invention relates to a speed control system for automatically controlling the speed of rotation of a rotating body so as to maintain the linear speed of travel of the part of the body which at any instant is opposite to a member moving relative to the axis of rotation of the body substantially constant relative to said member, or otherwise to control the speed of rotation of the body relative to said member according to a desired law.

According to the present invention the rotating body is driven through an electromagnetic coupling device whose speed is controlled by varying the energisation of an exciter coil and this energisation is in turn controlled in dependence upon the position of the member relative to the axis of rotation of the body to adjust the relative speed of rotation of the body so that the linear speed of the part of the body which at any instant is opposite the moving member is maintained substantially constant or otherwise controlled according to a desired law.

According to a feature of the invention the system includes means for producing a bias proportional to the radial position of the member relative to the body and this bias is fed to control the excitation of the electromagnetic coupling and hence the speed of rotation of its output shaft driving the body. The bias may be controlled by a potentiometer fed from a D.C. source, the slider of the potentiometer rotating with movement of the member to produce a varying D.C. output which is in turn fed to control a magnetic amplifier whose output is employed as a bias controlling the excitation of the electromagnetic coupling. The arrangement may be such that as the radial distance between the member and the axis of rotation of the body decreases, the speed of rotation of the body increases to maintain the linear speed of travel of the part of the body which at any instant is opposite the member substantially constant. The magnetic amplifier may consist of a pair of parallel connected auto-excited transductors and the output from the potentiometer may be fed to the magnetic amplifier through a cathode follower circuit.

The speed control system may also include means for manually controlling the speed of the rotatable body as desired and additionally, or alternatively, means for presetting the speed of rotation of the body to a desired value. Switch means may be provided for selecting between the different means of speed control i.e. manual speed control, preset speed control, or automatic speed control to maintain the desired speed of travel of the part of the body which is opposite the member at any time.

According to a further feature of the invention the output shaft of the electromagnetic coupling device is provided with a feedback generator which produces an output varying as a function of the output shaft speed and which is employed in the speed control circuit to maintain the output shaft speed substantially constant under conditions of manual or preset speed control.

Although the speed control arrangement according to this invention may be employed for any application where it is desired to control the speed of a rotating body according to a desired law and more particularly so as to maintain the linear speed of travel of the part of the body which at any instant is opposite a moving member substantially constant relative to the member as it moves relative to the axis of rotation of the body, the arrangement according to this invention is particularly suitable for driving the headstock of a lathe in order to maintain the linear speed of travel of a tool relative to a rotating workpiece substantially constant with rotation of the workpiece and as the tool travels to alter the radial distance between the tool and the axis of rotation of the workpiece.

In order that the invention may be more fully understood, an embodiment of the invention for controlling the speed of the headstock of a lathe will now be described with reference to the accompanying drawings, in which:

FIGURE 2 shows explanatory curves.

Figure 1:
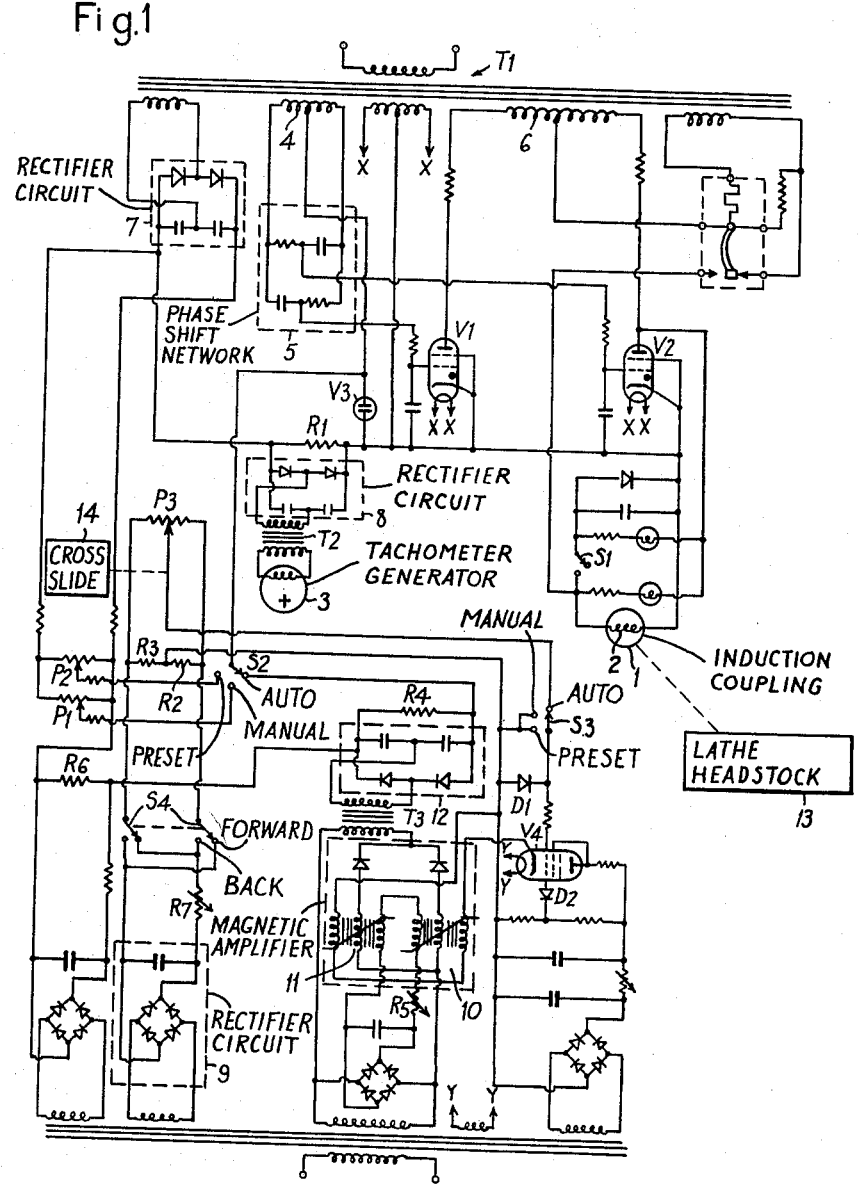
FIGURE 1 is a circuit diagram of the speed control arrangement.

Referring to FIGURE 1 the circuit diagram shown is intended for controlling the speed of the headstock of a lathe either manually, or at a preset value, or automatically so that the linear speed of travel of a workpiece under a cutting or other tool is maintained substantially constant, despite a decrease in radius of the workpiece as the cutting or other tool operates on it. The circuit includes a basic speed control section comprising valves V1, V2 and V3 and a section for effecting the constant cutting speed control comprising valve V4 and transductors 10 and 11. The driving motor for the lathe is not shown but the induction coupling which it drives is indicated at 1 having an exciter coil 2. The induction coupling in turn drives the headstock 13 of the lathe. A feedback generator 3 is also driven by the output shaft of the coupling. Energisation of the coupling exciter coil is controlled through the switch S1. The exciter coil of the coupling is fed with a D.C. current obtained from a full wave thyratron rectifier arrangement V1 and V2, the grid firing angle of which is controlled by various applied bias voltages, as will be hereinafter explained. Firstly, an A.C. bias from the secondary winding 4 of the transformer T1 is applied to the grids of the thyratrons through the phase shift network 5 such that the grid potentials of the thyratrons are shifted 90° in phase with respect to the anode voltage supplied from the secondary winding 6 of the transformer T1. When the alternating grid bias curve crosses the critical cathode/grid voltage curve during the positive half cycle of anode voltage the thyratrons will fire. Once conduction has been initiated it continues for the rest of the positive half cycle of anode voltage.

For manual speed control the potentiometer P1 is provided which is fed with D.C. from the rectifier circuit 7 whilst a second potentiometer P2 is provided, in parallel with P1, which can be set up to provide a preset speed. The voltage from the sliders of the potentiometers P1 and P2 is applied as a bias to the grids of the thyratrons V1 and V2 through the selective switch S2 in the "manual" and "preset" positions respectively.

The potentiometers P1 and P2 are fed with D.C. such that increasing voltage on the sliders tends to carry the grids of V1 and V2 heavily positive with respect to their cathodes. In series with this potential is the potential developed across the load resistor R1 of the rectifier unit 8 fed via in a transformer T2 from the A.C. tacho-generator 3 on the coupling output shaft. As the coupling runs up to speed, because the thyratrons V1 and V2 are fully conducting, the feedback voltage in the grid circuit cancels that applied from the speed potentiometers P1 or P2. Steady-state conditions are reached when the thyratron grids have such a potential relative to their cathodes that the current in the exciter coil 2 of the coupling allows sufficient torque to be generated by the coupling to meet the load torque demand at the speed set.

Excessive voltages applied between grids and cathodes of thyratrons V1 and V2 is avoided by the use of a neon tube V3 connected between the common grid and cathode lines.

This control system is active for both manual and preset speed controls.

In order to provide a changeover from manual or preset speed control to automatic speed control the switches S2 and S3 are provided. The potentiometer P3 for achieving constant cutting speed control is fed from the rectifier circuit 9 and is mounted on the saddle of the lathe with its shaft geared to the cross-slide 14. The gear ratio is such that P3 makes one full revolution for the total travel of the cross-slide which is equivalent to twice the maximum cutting radius.

Assuming the tool rest at the maximum cutting radius, and the relative speed between the tool and workpiece as 100%, then the spindle speed is 5% maximum. As the tool rest on the cross-slide is moved in towards the centre, the spindle speed rises to conform with a reciprocal law, reaching 100% at 5% cutting radius.

Potentiometer P3 forms two arms of a bridge, the other two arms being resistors R2 and R3 and the whole being fed with D.C. from rectifier unit 9. The output of the bridge is applied between grid and cathode of a cathode follower valve V4, the drive to potentiometer P3 being arranged so that the null position is reached at its centre, corresponding to 5% cutting radius. In the cathode lead of the cathode follower V4 is connected the control windings of a pair of parallel-connected auto-excited transductors 10 and 11 forming a magnetic amplifier. As potentiometer P3 is moved away from the null position, a positive polarity output voltage gives an equivalent increase in transductor control winding current and an increase in the voltage applied to the output transformer T3. A negative polarity output voltage is by-passed at the grid of the cathode follower valve.

The polarity conscious ouput of potentiometer P3 is required to allow working from one side of the work at a time. For working from the opposite side of the work, a polarity change switch S4 is provided in the D.C. output from rectifier circuit 9 which reverses the polarity of the output to the cathode follower without affecting the signal form.

The change in resistance value at the slider of P3 is linear and the transductors are designed so that the equivalent change in the voltage applied to the primary of transformer T3 is inverse reciprocal in form. The output voltage from T3 is rectified in a voltage-doubler circuit 12 and applied across resistor R4 which is connected in the grid-bias line of the thyratron valves V1 and V2 when S2 is in the "automatic" position.

A D.C. bias winding is fitted to the transductors, fed via resistor R5, to position the control working point at the required level and to allow compensation for tolerances in the transductors and cathode follower valve V4.

Referring now to FIGURE 2, the voltage developed across resistor R4 is shown as curve D. The required output voltage is curve A. The fixed D.C. control voltage for manual and preset working is developed across P1 and P2 as is shown in curve B. For working at a constant cutting speed this voltage is boosted by the D.C. voltage developed across resistor R6 which is called the residual bias voltage and counters the residual output of the transductors 10 and 11 under no-signal conditions. The sum of these two voltages forms curve C in FIGURE 2. Curve A is obtained by subtracting curve D from curve C.

The coupling output speed is directly proportional to the sum of the three control voltages so that curve A in FIGURE 2 represents speed as well as a voltage signal.

In operation of the lathe at a constant cutting speed, the datum position of the slide rest is set by the tools mounted in it and will vary from job to job according to the tool used and the position at which it is bolted down in the tool rest. This requires the shafts of potentiometer P3 to be reset for each tool, the facility being made available by fitting the shaft in a bush in the driving gear such that the shaft may be reset to a datum for each tool by using a reset knob mounted on its end.

The operator is thus required to run the cutting tool into the centre position and set potentiometer P3 to the datum value to set up the machine for constant cutting speed working.

The only other requirement is to select the spindle speed at the initial cutting radius, this being achieved by setting a relative speed dial which adjusts resistor R7.

It will be appreciated that the headstock speed at any radius of cutting is determined both by the type of tool in use and the material on which it is being used. The description of operation given so far assumes the datum speed range to be operative, that is 100% speed at 5% radius and 3% speed at 100% radius. The relative speed dial enables both ends of the scale to be shifted alternatively.

When the dial is in the central position, at unity setting, the datum speed range is operative. Rotating the dial to a fractional dial setting will shift the 5% speed point towards the centre, rotating it to a multiplier setting shifts the 100% speed point to a larger cutting radius. Since the reciprocal law must hold for all positions of the slide rest, the whole datum speed range is multiplied either up or down according to the relative speed dial setting. When using dial settings other than unity it will be apparent that much of the slide rest travel should generate spindle speeds outside the speed boundaries of the coupling. When this occurs, the coupling runs at the boundary value of speed.

It will be seen that the division or multiplication of the datum speed range is obtained by varying the D.C. potential applied to the bridge formed by potentiometer P3 and resistors R2 and R3. This means that the out-of-balance potential (and thus the speed change instruction) fed to the cathode follower V4 for unit change of position of the slide rest will be multiplied up or down as the bridge potential is multiplied up or down. The potential limits to the bridge output which correspond to the coupling speed limits are enforced by two diodes D1 and D2 connected to the grid of the cathode follower. These act additionally to limit the cathode current to rated values for the valve V4. The coupling speed is thus controlled in accordance with the required reciprocal law to the boundary value, thereafter holding the boundary value for further misalignment of the bridge detector circuit.

The speed of rotation of the workpiece relative to the tool can be controlled according to any other desired law, for example by varying the change in the resistance along the track of the potentiometer P3.

I claim:

1. A speed control sytem for automatically controlling the speed of travel of a body in accordance with the movement of a member, comprising an electromagnetic induction coupling device for driving said body, an exciter coil which is energised to cause said electromagnetic coupling device to operate, variation of the energisation of said exciter coil controlling the speed of said coupling device, and means for controlling the energisation of said exciter coil in dependence upon movement of the member in order to control the speed of travel of the body relative to the movement of the member according to a desired law, said controlling means comprising a potentiometer having a slider, means for coupling the slider of the potentiometer to rotate with movement of the member to produce a linearly varying voltage output proportional to the position of the member relative to the body, an amplifier circuit, means for feeding the output voltage from the potentiometer to the amplifier circuit, said amplifier circuit producing a reciprocal output voltage from the linearly varying input voltage applied from the potentiometer and means for feeding the output from the amplifier circuit as a bias to control the energisation of the exciter coil of said coupling.

2. A speed control system for automatically controlling the speed of rotation of a rotating body so as to maintain the linear speed of travel of the part of the body which at any instant is opposite to a member moving relative to the axis of rotation of the body substantially constant relative to said member, comprising an electromagnetic induction coupling device for rotating said body, an exciter coil which is energised to cause said electromagnetic coupling device to operate, variation of the energisation of said exciter coil controlling the speed of said coupling device, and means for controlling the energisation of said exciter coil in dependence upon the position of the member relative to the axis of rotation of the body to adjust the relative speed of rotation of the body so that the linear speed of the part of the body which at any instant is opposite to the moving member is maintained substantially constant, said controlling means comprising a potentiometer having a slider, means for coupling the slider of the potentiometer to rotate with movement of the member to produce a linearly varying voltage output proportional to the position of the member relative to the body, an amplifier circuit, means for feeding the output voltage from the potentiometer to the amplifier circuit, said amplifier circuit producing a reciprocal output voltage from the linearly varying input voltage applied from the potentiometer and means for feeding the output from the amplifier circuit as a bias to control the energisation of the exciter coil of said coupling.

3. A speed control system for automatically controlling the speed of travel of a body in accordance with the movement of a member, comprising an electromagnetic induction coupling device for driving said body, an exciter coil which is energised to cause said electromagnetic coupling device to operate, variation of the energisation of said exciter coil controlling the speed of said coupling device, and means for controlling the energisation of said exciter coil in dependence upon movement of the member in order to control the speed of travel of the body relative to the movement of the member according to a desired law, said controlling means comprising a potentiometer having a slider, means for coupling the slider of the potentiometer to rotate with movement of the member to produce a linearly varying voltage output proportional to the position of the member relative to the body, a magnetic amplifier circuit, means for feeding the output voltage from the potentiometer to the magnetic amplifier circuit, said magnetic amplifier circuit producing a reciprocal output voltage from the linearly varying input voltage applied from the potentiometer, and means for feeding the output from the magnetic amplifier circuit as a bias to a thyratron control circuit to control the energisation of the exciter coil of said coupling.

4. A system as claimed in claim 3, comprising a cathode follower circuit, means for feeding the output voltage from the potentiometer to the output of the cathode follower circuit and means for feeding the output of the cathode follower circuit to the input of said magnetic amplifier circuit.

5. A system as claimed in claim 3, comprising a D.C. supply, a polarity changeover switch connected to the output of said D.C. supply, and means connecting said polarity changeover switch to the opposite ends of the potentiometer whereby the polarity of the D.C. supply connected across the potentiometer can be reversed.

6. A system as claimed in claim 3, comprising a bridge circuit having two arms formed by said potentiometer and two arms formed by two fixed resistors connected in series, a D.C. supply, means for connecting the D.C. supply across the potentiometer and the two series connected fixed resistors and means for connecting the slider of the potentiometer and the junction between the two series connected fixed resistors to the input of the magnetic amplifier circuit.

7. A speed control system for automatically controlling the speed of travel of a body in accordance with the movement of a member, comprising an electromagnetic induction coupling device for driving said body, an exciter coil which is energised to cause said electromagnetic coupling device to operate, variation of the energisation of said exciter coil controlling the speed of said coupling device, and means for controlling the energisation of said exciter coil in dependence upon movement of the member in order to control the speed of travel of the body relative to the movement of the member according to a desired law, said controlling means comprising a potentiometer having a slider, means for coupling the slider of the potentiometer to rotate with movement of the member to produce a linearly varying voltage output proportional to the position of the member relative to the body, a magnetic amplifier circuit, means for feeding the output voltage from the potentiometer to the magnetic amplifier circuit, said magnetic amplifier circuit producing a reciprocal voltage from the linearly varying input voltage applied from the potentiometer means for feeding the output from the magnetic amplifier circuit as a bias to control the energisation of the exciter coil of said coupling, means for manually controlling the speed of movement of the body, means for obtaining a preset speed of movement of the body and selector switch means for selecting between manual speed control, preset speed control and automatic speed control of the movement of said body.

8. A system as claimed in claim 7, in which the output shaft to the electromagnetic coupling device is provided with a feedback generator which produces an output varying as a function of the output shaft speed which is employed in the speed control circuit to maintain the output shaft speed substantially constant under conditions of manual and preset speed control.

References Cited by the Examiner

UNITED STATES PATENTS

| | | | |
|---|---|---|---|
| 2,704,344 | 3/55 | Winther | 318—327 |
| 2,891,206 | 6/59 | Dillonaire | 318—327 |
| 3,061,748 | 10/62 | Fehn | 310—98 |

MILTON O. HIRSHFIELD, *Primary Examiner.*

DAVID X. SLINEY, *Examiner.*